No. 645,879. Patented Mar. 20, 1900.
M. C. THOMAS.
SPECTACLE OR EYEGLASS MOUNTING.
(Application filed Feb. 3, 1899.)
(No Model.)
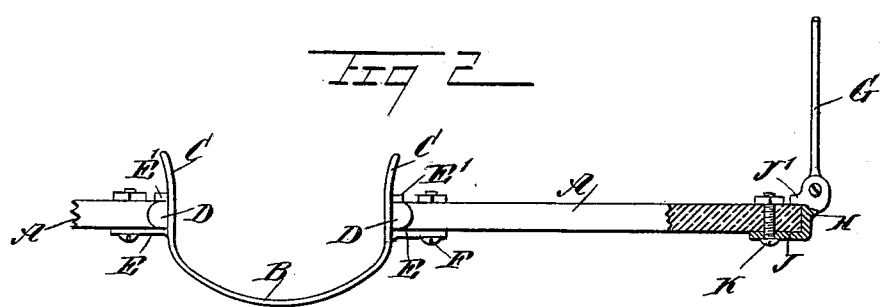
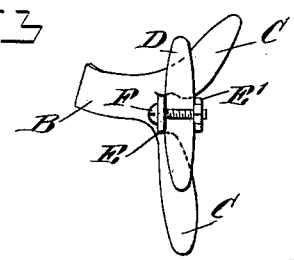
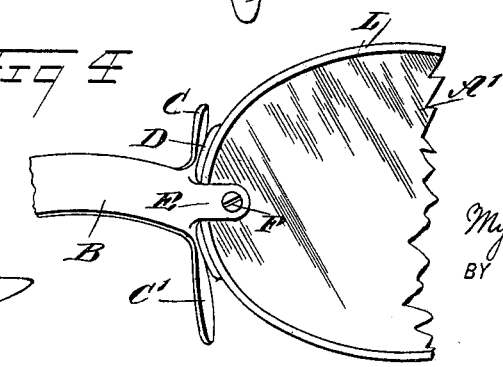
WITNESSES:
H. Walker
INVENTOR
Myron C. Thomas.
BY
ATTORNEYS.

UNITED STATES PATENT OFFICE.

MYRON CHARLES THOMAS, OF WAVERLY, NEW YORK, ASSIGNOR OF ONE-HALF TO FRANK E. MUNN, OF SAME PLACE.

SPECTACLE OR EYEGLASS MOUNTING.

SPECIFICATION forming part of Letters Patent No. 645,879, dated March 20, 1900.

Application filed February 3, 1899. Serial No. 704,383. (No model.)

*To all whom it may concern:*

Be it known that I, MYRON CHARLES THOMAS, of Waverly, in the county of Tioga and State of New York, have invented certain new and useful Improvements in Spectacle or Eyeglass Mountings, of which the following is a full, clear, and exact description.

The object of the invention is to provide certain new and useful improvements in spectacle and eyeglass mountings, whereby the lenses are securely held in place in the frame and a fine and neat appearance is given to the article.

The invention consists of novel features and parts and combinations of the same, as will be fully described hereinafter and then pointed out in the claim.

A practical embodiment of my invention is represented in the accompanying drawings, forming a part of this specification, in which similar characters of reference indicate corresponding parts in all the views.

Figure 1 is an enlarged front elevation of the improvement as applied to rimless spectacles and eyeglasses. Fig. 2 is a plan view of the same with part in section on the line 2 2 in Fig. 1. Fig. 3 is an edge view of the bridge-guard and fastening devices for the lenses, and Fig. 4 is a front elevation of the improvement as applied to spectacles having a rim-frame.

The spectacles, as shown in Figs. 1 and 2, are provided with lenses A, connected one with the other by a bridge B, preferably at its ends, with an integral bar consisting of upwardly and rearwardly extended arms C and downwardly-extended arms C', the said downwardly-extended arms being substantially at right angles to the length of the bridge, and also formed on each end of the bridge and integral therewith is an ear E, provided with a perforation to receive a bolt F, which passes through an aperture in the lens to fasten the latter in place on the ear.

A short ear E' is located directly opposite the ear E and is designed to engage against the inner face of the lens, as indicated in Fig. 2. At each end of the bridge, between the ears, is a curved strip D for engaging against the edge of the lens. The strip D and ear E' are of one piece of metal soldered or otherwise attached to the nose-piece. By arranging the arms C and C' as described the mounting will rest easily on a person's nose without undue pressure.

It will be seen that by the construction described the lens is embraced between the ears E and E' and its edge is engaged by the rim portions D, and the said lens is fastened in position, engaging the several parts specified, by the bolt F, passing through the ear E and lens A. The bolt is preferably screwed in the tapped opening of the ear E, and the nut for the bolt engages the inner face of the lens.

The ears E are substantially in line with the longitudinal center of the bridge, so that the lenses will not have a tendency to tilt the bridge on a person's nose, as might be the case were the connections above or below the bridge-line.

Each temple G is pivoted to a temple-body H, having the rim parts I for engaging the edge of the lens A directly opposite the rim parts D, and on said body H are also formed oppositely-arranged ears J J', of which the ear J is longer than the ear J' and carries a bolt K, similar to the bolt F and serving to hold the lens to the ear J.

By the arrangement described the lens is securely fastened in position in the frame of the spectacle, and at the same time provision is made to securely hold the bridge in position on the nose of the wearer without danger of the spectacles shifting to the right or left, owing to the guards formed by the arms C C'.

For rim-frame spectacles, as indicated in Fig. 4, I hold the lens A' in the rim L and solder the inner portion of the rim L to the rim parts D integral on the bridge, together with the guard-arms C and C' and the ears E and E', of which the ear E is engaged by the bolt F to securely fasten the lens in place and the several parts together.

Having thus fully described my invention, I claim as new and desire to secure by Letters Patent—

A spectacle or eyeglass mounting, comprising a nose-bridge consisting of a plate having upwardly and rearwardly inclined arms at its ends, and arms at its ends extended downward at substantially right angles to the length of the bridge, all of said arms being integral with the bridge, perforated ears on the end of the bridge and integral therewith for engaging one side of the lenses, the said ears being formed between the adjacent ends of the arms substantially in line with the longitudinal center of the bridge, short ears on the ends of the bridge for engaging the opposite sides of the lenses, and curved strips on the ends of the bridge between the ears for engaging the edges of the lenses, said strips and short ears being of one piece of metal attached to the bridge, substantially as specified.

MYRON CHARLES THOMAS.

Witnesses:
 FRANK L. HOWARD,
 H. C. BRUSTER.